United States Patent
Iwami et al.

(10) Patent No.: US 9,013,122 B2
(45) Date of Patent: Apr. 21, 2015

(54) ELECTRIC POWER STEERING CONTROL DEVICE AND ELECTRIC POWER STEERING CONTROL METHOD

(71) Applicant: Mitsubishi Electric Corporation, Chiyoda-ku, Tokyo (JP)

(72) Inventors: Eiji Iwami, Chiyoda-ku (JP); Takashi Goto, Chiyoda-ku (JP); Susumu Zeniya, Chiyoda-ku (JP); Daisuke Tanaka, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 134 days.

(21) Appl. No.: 13/932,584

(22) Filed: Jul. 1, 2013

(65) Prior Publication Data
US 2014/0118866 A1    May 1, 2014

(30) Foreign Application Priority Data
Nov. 1, 2012   (JP) ................................. 2012-242089

(51) Int. Cl.
*H02P 5/74*   (2006.01)
*H02H 7/08*   (2006.01)

(52) U.S. Cl.
CPC ....................................... *H02H 7/08* (2013.01)

(58) Field of Classification Search
CPC ....................................................... H02H 7/08
USPC ....................................... 318/34, 558; 361/25
See application file for complete search history.

(56) References Cited

U.S. PATENT DOCUMENTS
5,925,995 A * 7/1999 Yoshida et al. ............... 318/434

FOREIGN PATENT DOCUMENTS
| JP | 4064600 B2 | 11/2001 |
| JP | 3605349 B2 | 3/2002 |
| JP | 2009-056849 A | 3/2009 |
| JP | 2011-098625 A | 5/2011 |

OTHER PUBLICATIONS
Japanese Office Action (Preliminary Notice of Reasons for Rejection), mailed Dec. 3, 2013, Application No. 2012-242089.

* cited by examiner

*Primary Examiner* — David S Luo
(74) *Attorney, Agent, or Firm* — Sughrue Mion, PLLC; Richard C. Turner

(57) ABSTRACT

Provided is an electric power steering control device which can realize a more appropriate countermeasure against heat in accordance with a thermal characteristic of a component used to supply a motor current. The electric power steering control device for assisting a steering force of a steering wheel of a vehicle including a control unit (10). The control unit (10) prestores a first overheat-protection characteristic corresponding to self-heating and a second overheat-protection characteristic corresponding to an ambient temperature for each component (12 to 15) mounted in the control unit as an overheat-protection characteristic specifying a correspondence relationship between a heat-source current value of the each component and an overheat-protection coefficient, and sequentially corrects a current upper-limit value obtained for the each component by using overheat-protection coefficients of both characteristics to continue current control in accordance with a smallest current upper-limit value of results of the correction.

8 Claims, 5 Drawing Sheets

ELECTRIC POWER STEERING CONTROL DEVICE AND ELECTRIC POWER STEERING CONTROL METHOD

BACKGROUND OF THE INVENTION

1. Field of the Invention

The present invention relates to an electric power steering control device and an electric power steering control method, which uses an electric motor to assist a steering force of a steering wheel, in particular, to a countermeasure against heat for the control device.

2. Description of the Related Art

When a motor is driven in a conventional electric power steering control device, a necessary current is controlled to flow to generate a necessary assist torque. Therefore, a countermeasure against heat generation is required for each of sections. Among the sections, a controller includes a large number of components to supply the current to the motor. Therefore, in the controller, a countermeasure against heat has been taken not only by improving heat radiation performance of each of the components but also by limiting the current to variably change a control amount.

As a conventional device, there exists an electric power steering device which uses a limited motor current expressed by an expression more closely corresponding to a heat radiating condition of an actual component based not on an expression of the first or second power of the current but on the combination of the expressions of the first power and the second power of the current (for example, see Japanese Patent No. 4064600). As another conventional device, there exists an electric power steering device which classifies thermal time constants of components into a small thermal time constant and a large thermal time constant in accordance with the components used in a control circuit for supplying a current to the motor and selects a smaller one of two current limiting values to limit the current (for example, see Japanese Patent No. 3605349).

However, the conventional technologies have the following problems.

It is certain that the conventional devices can limit the current, and therefore can carry out a countermeasure against heat. However, the conventional devices put so high priority on safety that there is a tendency to limit the motor current excessively. Therefore, when a high current flows as the motor current, the motor current is limited early. Then, even after the motor current is reduced or the driving is stopped, the limitation of the motor current is continued for a relatively long period of time, which leads to reduced assist of the steering force.

SUMMARY OF THE INVENTION

The present invention has been made to solve the problems described above, and has an object to provide an electric power steering control device and an electric power steering control method, which can realize a more appropriate countermeasure against heat in accordance with a thermal characteristic of a component used to supply a motor current and can generate a larger assist torque than a conventional one.

According to an exemplary embodiment of the present invention, there is provided an electric power steering control device for assisting a steering force of a steering wheel of a vehicle, the electric power steering control device including a control unit for supplying a current for driving an electric motor, in which the control unit prestores a first overheat-protection characteristic corresponding to self-heating and a second overheat-protection characteristic corresponding to an ambient temperature in a storage section for each component mounted in the control unit as an overheat-protection characteristic specifying a correspondence relationship between a heat-source current value of the each component and an overheat-protection coefficient defining an increase/decrease amount of a current upper-limit value, and sequentially corrects the current upper-limit value obtained for the each component by using overheat-protection coefficients of both the first overheat-protection characteristic and the second overheat-protection characteristic to continue current control for the electric motor with a limitation on the current for driving the electric motor in accordance with a smallest current upper-limit value of results of the correction.

According to another exemplary embodiment of the present invention, there is provided an electric power steering control method used for an electric power steering control device for assisting a steering force of a steering wheel of a vehicle, the electric power steering control device including a control unit for supplying a current for driving an electric motor, the electric power steering control method being configured to perform current control for the electric motor in accordance with a current upper-limit value based on a thermal characteristic of each component mounted in the control unit, and including: prestoring a first overheat-protection characteristic corresponding to self-heating and a second overheat-protection characteristic corresponding to an ambient temperature in a storage section for the each component as an overheat-protection characteristic specifying a correspondence relationship between a heat-source current value of the each component and an overheat-protection coefficient defining an increase/decrease amount of the current upper-limit value; and sequentially correcting, in the control unit, the current upper-limit value obtained for the each component by using overheat-protection coefficients of both the first overheat-protection characteristic and the second overheat-protection characteristic to continue the current control in accordance with a smallest current upper-limit value of results of the correction.

According to the present invention, the current upper-limit value for protection against heating for each component is sequentially corrected in consideration of two thermal characteristics, which are a self-heating characteristic and an ambient-temperature characteristic, for each component used in the control device. The smallest current upper-limit value is selected from the results of correction to perform the current control. As a result, it is possible to obtain the electric power steering control device and the electric power steering control method, which can realize a more appropriate countermeasure against heat in accordance with the thermal characteristic of the component used to supply the motor current, and can generate a larger assist torque than a conventional one.

DETAILED DESCRIPTION OF THE PREFERRED EMBODIMENTS

In the following, an electric power steering control device and an electric power steering control method according to exemplary embodiments of the present invention are described referring to the accompanying drawings.

First Embodiment

Figure 1:
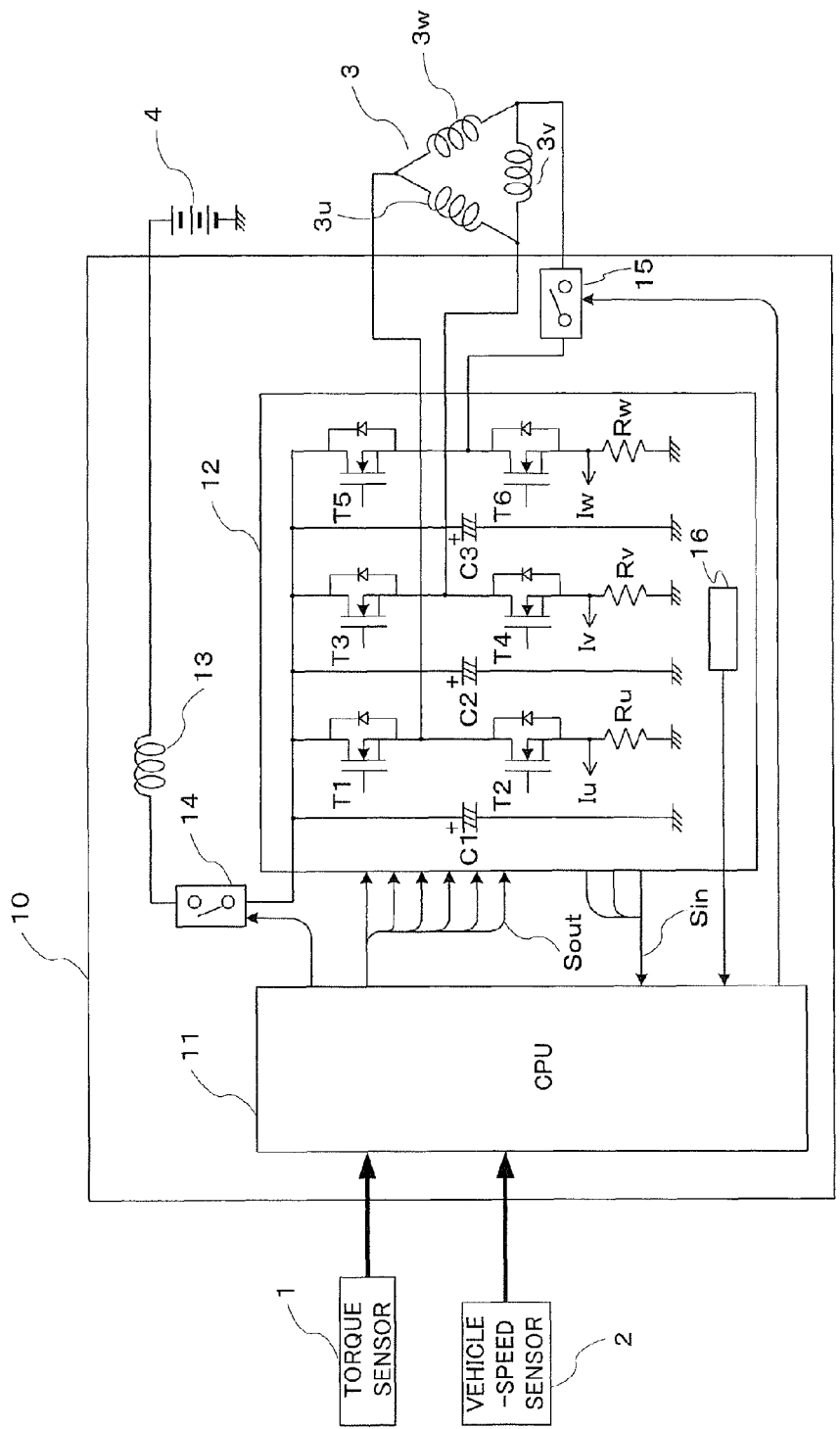
FIG. 1 is a diagram illustrating an overall configuration of an electric power steering control device according to a first embodiment of the present invention.

FIG. 1 is an overall configuration diagram illustrating an electric power steering control device according to a first embodiment of the present invention. The electric power steering control device of the first embodiment includes a torque sensor 1, a vehicle-speed sensor 2, a motor 3, a battery 4, and a control unit 10. A three-phase brushless motor is used as the motor 3. A state in which the motor 3 includes coils $3u$, $3v$, and $3w$ is herein exemplified.

The control unit 10 includes a CPU 11, a driving section 12, a choke coil 13, a power-supply relay 14, and a motor relay 15. Further, the driving section 12 includes six switching elements T1 to T6 as represented by FETs, three noise-prevention capacitors C1, C2, and C3, and three shunt resistors Ru, Rv, and Rw for detecting a current flowing through the motor 3.

The torque sensor 1 is provided in the vicinity of a steering wheel (not shown) of a vehicle, and detects a steering torque applied by a driver. The vehicle-speed sensor 2 detects a speed of the vehicle. By the rotation of the motor 3 mounted to a steering column or a rack shaft of the vehicle, a steering force of the steering wheel is assisted.

A current supply source for the motor 3 is the battery 4 of the vehicle. The control unit 10 computes and outputs a control amount of the current supply source. The CPU 11 included in the control unit 10 is the center for computations and processing. The driving section 12 is a driving circuit for driving the motor 3 based on an output signal (Sout) of the CPU 11. Further, in a universal power supply section for the driving section 12, the choke coil 13 for noise and the power-supply relay 14 are provided.

As described above, the CPU 11 controls the switching of the switching elements T1 to T6 based on signals input from the torque sensor 1 and the vehicle-speed sensor 2 to calculate the control amount to be supplied to the motor 3 so as to supply a desired current to the respective coils $3u$, $3v$, and $3w$ of the motor 3.

On the other hand, detection currents Iu, Iv, and Iw detected by the shunt resistors Ru, Rv, and Rw are transmitted to the CPU 11 as an input signal (Sin). Then, the CPU 11 calculates a final current output value based on a deviation between the control amount converted into a current value and the detected current, and then converts the final current output value into a voltage value. In this manner, the CPU 11 outputs the output signal Sout for driving the switching elements T1 to T6. In the manner described above, the CPU 11 performs so-called feedback control based on the current.

Further, the CPU 11 controls opening/closing of the power-supply relay 14. In this manner, in case of abnormality, the CPU 11 can interrupt the supply of the motor current. Further, between the motor coil $3w$ and the switching elements T5 and T6 for driving the motor coil $3w$, the motor relay 15 (referred to as "motor relay 15" for the distinction from the power-supply relay 14) is provided.

For the simplification of description, there is exemplified the case where the motor relay 15 is provided only to the motor coil $3w$. The motor relay 15 can also be inserted in another phase. By providing the motor relay 15 described above, the control unit 10 can be configured to interrupt, when an abnormality occurs in only one phase, a circuit of the phase in which the abnormality occurs.

The switching elements T1 to T6 are mounted in the vicinity of a heat radiator (heat sink) (not shown). In the control unit 10, a temperature sensor 16 is mounted in the vicinity of a heat-generating component (switching elements, for example) of the driving section 12 or the heat sink for radiating heat of the heat-generating component.

In the control device configured as described above, the following seven components are picked up from the upstream side as the components that need to be protected against overheat.

(1) choke coil 13
(2) power-supply relay 14
(3) capacitors C1, C2, C3
(4) switching elements T1 to T6
(5) shunt resistors Ru, Rv, Rw
(6) motor relay 15
(7) motor coils $3u$, $3v$, $3w$ As components not illustrated in FIG. 1, there are permanent magnets included in the motor 3, wirings, terminals for connecting the wirings to each other, and the like. However, the wirings and the terminals have higher heat resistance than the seven components described above in view of materials and resistance values, and therefore are herein ignored.

The seven components described above have different overheat-protection characteristics depending on materials, current values, heat-radiating structures, and the like. In order to determine an upper-limit current value by using any representative one of the individually different overheat-protection characteristics, it is inevitable to adjust to the overheat-protection characteristic of the component having the lowest heat resistance. As a result, there is a possibility that the countermeasure is excessive for the components having the high heat resistance.

Therefore, a measure for determining overheat protection according to the present invention, which can realize a more appropriate countermeasure against heat in accordance with the thermal characteristics of the individual components used to supply the motor current is described below in detail. The determination of the overheat protection is executed by the CPU 11.

In general, the current value is required to be determined so that a temperature of a target component does not exceed a rated (upper-limit) temperature of the component. A characteristic of the component for overheat protection against the current depends on a temperature rise characteristic of the component during energization. The component is frequently mounted to the heat sink for the improvement of heat radiation performance. Therefore, the temperature rise characteristic is considered as a characteristic of the component including the heat sink.

In general, a temperature rise of the component which starts generating heat with a heat generation amount W after t hours is expressed by the following Expression (1).

$$\Delta T1 = RW1 \times W1 \times \{1 - \exp(-t/\tau 1)\} \tag{1}$$

where $\Delta T1$ is a temperature rise value (° C.) by heat generation of the component;

RW1 is thermal resistance (° C./W);

W1 is a heat generation amount (W); and

τ1 is a time constant (sec, heat resistance from the component to an environment around the component×thermal capacity).

The heat generation amount W1 is expressed by the following Expression (2) using a resistance value R1 (Ω) of the component and a current I1 (A) flowing through the component.

$$W1 = R1 \times I1^2 \quad (2)$$

By substituting Expression (2) described above into Expression (1) described above, the following Expression (3) is obtained.

$$T1 = K1 \times I1^2 \times \{1 - \exp(-t/\tau 1)\} \quad (3)$$

where K1=RW1×R1.

Assuming that an ambient temperature of the component remains unchanged from an initial ambient temperature Ti (° C.), a temperature T1 of the component is expressed by the following Expression (4).

$$T1 = \Delta T1 + Ti \quad (4)$$

In practice, however, the ambient temperature of the component changes with the heat radiation from other components. Therefore, basically, it is considered that the ambient temperature of the component also increases. The ambient temperature is affected by the heat generation from various components. Basically, however, an expression equivalent to Expression (3) described above is used as an expression for calculating the ambient temperature in consideration of the heat generation of a dominant component. Specifically, the temperature of the component can be expressed by the following Expression (5).

$$T1 = K1 \times I1^2 \times \{1 - \exp(-t/\tau 1)\} + K2 \times I2^2 \times \{1 - \exp(-t/\tau 2)\} + Ti \quad (5)$$

A change in temperature of each of the components is specifically examined based on Expression (5) described above.

[Switching Elements T1 to T6]

First, in the case where the FETs are used as the switching elements T1 to T6, FETs of the u-phase (corresponding to the switching elements T1 and T2) are considered as representatives. The FETs are mounted to the heat sink in the control unit 10. Therefore, under the effect of the heat generation of the FETs of the other phases, the temperature of the heat sink also changes.

The FETs all have the same specifications. Assuming that the thermal resistance at the time of heat radiation to the heat sink is the same for all the FETs and a thermal distribution of the heat sink is uniform, the FETs of the u-phase can be expressed by the following Expressions (6) to (9).

$$Tfet\_u = K1 \times Iu^2 \times \{1 - \exp(-t/\tau 1)\} + K2 \times Iu^2 \times \{1 - \exp(-t/\tau 2)\} + K2 \times Iv^2 \times \{1 - \exp(-t/\tau 2)\} + K2 \times Iw^2 \times \{1 - \exp(-t/\tau 2)\} + Ti \quad (6)$$

$$Tfet\_u = K1 \times Iu^2 \times \{1 - \exp(-t/\tau 1)\} + K2 \times (Iu^2 + Iv^2 + Iw^2) \times \{1 - \exp(-t/\tau 2)\} + Ti \quad (7)$$

$$Tfet\_u = K1 \times Iu^2 \times \{1 - \exp(-t/\tau 1)\} + K2 \times Im^2 \times \{1 - \exp(-t/\tau 2)\} + Ti \quad (8)$$

$$Tfet\_u = K1 \times Iu^2 \times \{1 - \exp(-t/\tau 1)\} + K2 \times Km \times Iu^2 \times \{1 - \exp(-t/\tau 2)\} + Ti \quad (9)$$

where

Iu is a current [A] flowing through the u-phase FETs;

Iv is a current [A] flowing through the v-phase;

Iw is a current [A] flowing through the w-phase;

Im is a motor current [Arms] ($Im^2 = \sqrt{(Iu^2 + Iv^2 + Iw^2)/3} = Km \times Iu^2$); and Km is a coefficient determined depending on a driving state of the motor.

Expression (6) described above corresponds to: temperature rise by the self-heating of the u-phase FETs (T1 and T2)+temperature rise of the heat sink by the heat generation of the u-phase FETs+temperature rise of the heat sink by the heat generation of the v-phase FETs+temperature rise of the heat sink by the heat generation of the w-phase FETs. Similarly, each of Expressions (8) and (9) expresses: temperature rise by the self-heating of the components+temperature rise by the peripheral components. The heat sink has a larger thermal capacity than that of the FETs, and therefore has a larger thermal time constant. Thus, the relationship expressed by the following Expression (10) is established.

$$\tau 1 < \tau 2 \quad (10)$$

Figure 2:
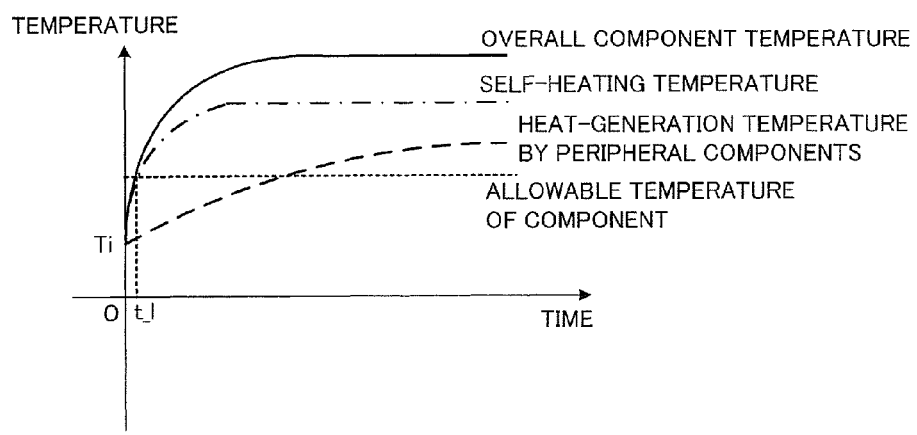
FIG. 2 is a thermal characteristic diagram according to the first embodiment of the present invention.
Figure 3:
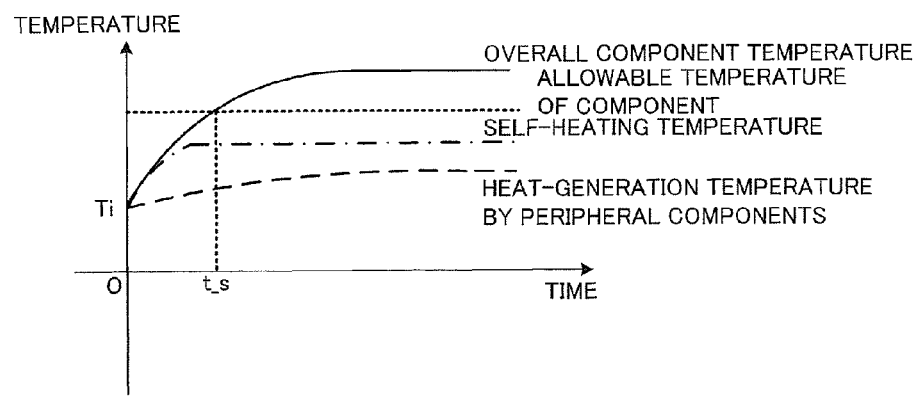
FIG. 3 is another thermal characteristic diagram according to the first embodiment of the present invention.

FIGS. 2 and 3 are thermal characteristic diagrams according to the first embodiment of the present invention. FIG. 2 is a graph showing a thermal characteristic when the current continuously flows through the FETs in a high-current region in which a temperature exceeds an allowable temperature only by the self-heating. In this case, the self-heating is dominant. On the other hand, FIG. 3 is a graph showing a thermal characteristic when the current continuously flows through the FETs in a low-current region in which the temperature exceeds the allowable temperature by the temperature rise caused by the peripheral components in addition to the self-heating. In this case, it can be said that the temperature rise by the peripheral components is dominant.

Figure 4:
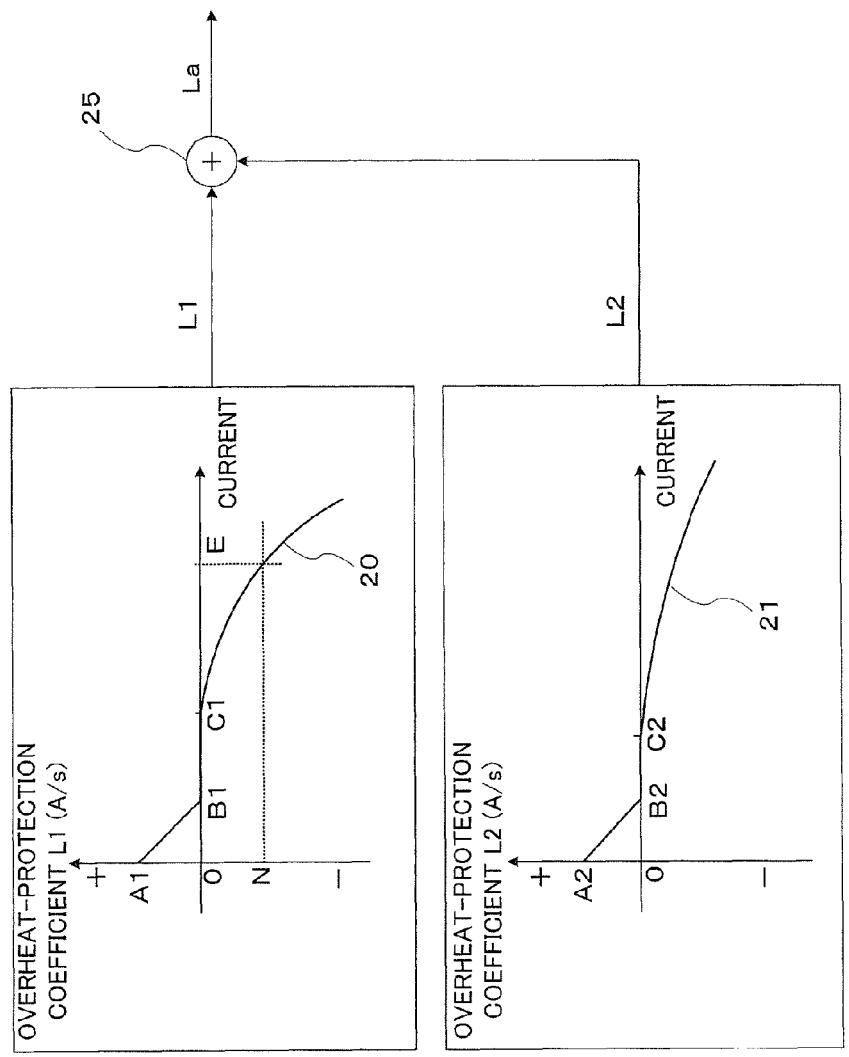
FIG. 4 is an overheat-protection characteristic diagram for each component according to the first embodiment of the present invention.

As described above, the self-heating (first term of Expression (9)) tends to be dominant when the current Iu is in the high-current region, whereas the ambient temperature (second term of Expression (9)) tends to be dominant when the current Iu is in the low-current region. FIG. 4 is an overheat-protection characteristic diagram of each of the components according to the first embodiment of the present invention.

The overheat-protection characteristic used in the present invention specifies the correspondence relationship between the current value of the current flowing through the component itself or a current value of another component which most thermally affects the component (hereinafter, the current values are collectively referred to as "heat-source current value") and an overheat-protection coefficient which defines the amount of increase/decrease in the current upper-limit value used for the current control of the motor 3. In FIG. 4, as the overheat-protection characteristic of the FET taken as an example of the component, two kinds of characteristics, that is, a self-heating characteristic 20 and an ambient-temperature characteristic 21 are shown.

The overheat-protection characteristic (coefficient) with respect to the temperature rise characteristic of the FETs approximately corresponds to the sum of the characteristic 20 depending on the self-heating and the characteristic 21 depending on the ambient temperature, as illustrated in FIG. 4.

For example, when the current flowing through the FETs (heat-source current, in ampere (A)) is in the low-current region (0 to C1 or 0 to C2), the overheat-protection coefficient decreases from a maximum value A1 or A2 to become 0 in the current region through B1 or B2 to C1 or C2. On the other hand, in the high-current region equal to or higher than C1 or C2, the overheat-protection coefficient is a value decreasing from 0 to a negative value in a gradually decreasing direction. Therefore, a limitation for overheat protection needs to be provided.

In the high-current region described above, the characteristic 20 depending on the self-heating exhibits a steep gradual decrease as compared with the characteristic 21 depending on the ambient temperature. The characteristic 20 can be used as the overheat-protection coefficient. The unit of the characteristic can be defined as an increase/decrease amount of the current upper-limit value per unit time, and therefore is ampere/second (A/s).

The characteristic (coefficient) shown in FIG. 4 is further described. When the current flowing through the FETs is C1 or lower, the characteristic 20 is not really required. If a high-current request (E) is calculated and the current corresponding to the request starts flowing, however, a gradual-decrease coefficient is N (A/s). Therefore, the limitation for overheat protection needs to be provided. The CPU 11 decreases the upper-limit current value at a rate of N ampere(s) (A) per second in accordance with the coefficient N.

For example, supposing E=50 (A), N=−3 (A/s), C1=20 (A), B1=10 (A), A1=1 (A/s), and the current value of the current flowing through the FETs is 50 (A), the current upper-limit value of the FETs starts decreasing at a rate of 3 (A) per second to reach C1. As described above, by using the overheat-protection coefficient, the current upper-limit value obtained for each of the components can be sequentially corrected.

Further, the reason of the presence of a characteristic segment from B1 to A1 is as follows. When a driver terminates an operation of the steering wheel, the current upper-limit value of the motor is returned toward the rated current value by setting the overheat-protection coefficient between B1 and A1 to a positive coefficient in consideration of the heat radiation performance.

The two characteristics 20 and 21 are added by an adder 25 to calculate an overheat-protection characteristic (coefficient La) of the corresponding component. Then, in accordance with the obtained value, the upper-limit value of the current is computed. In this manner, the current upper-limit value is obtained for each of the components.

[Motor Coils, Power-Supply Relay, Motor Relay, and Shunt Resistors]

Next, the motor coils are considered. Even in the case of the coils, the heat generation of the coils themselves is dominant in the high-current region, whereas the ambient temperature is dominant in the low-current region. Therefore, the motor coils also have a characteristic similar to the characteristic 21 shown in FIG. 4, as in the case of the switching elements described above. However, the values (A2, B2, and C2) of the characteristic and the gradual-decrease curve of the motor coils may be different from those of the FETs.

As long as each of the power-supply relay 14 and the motor relay 15 has a structure having a mechanical switching mechanism, a potential difference is scarcely generated in the switching mechanism. Therefore, the overheat protection can be ignored in some cases. Alternatively, only the effect of the ambient temperature (corresponding to the characteristic 21 shown in FIG. 4) may be taken into consideration.

However, if an electronic relay (for example, an FET or an IGBT) is used as each of the power-supply relay 14 and the motor relay 15, the gradual-decrease characteristic as described above can be used. Moreover, the shunt resistors Ru, Rv, and Rw are equivalent to the FETs in terms of the current, and therefore can be treated in the same manner as for the FETs.

[Capacitors]

Next, the capacitors C1 to C3 are described. The capacitors C1 to C3 serve to remove a ripple generated by the switching of the FETs and to supply electric power to the FETs, and are provided in the vicinity of the FETs, respectively. Therefore, although self-heating of the capacitors occurs, the amount of self-heating is not large. The capacitors are affected mainly by the ambient temperature, and therefore the temperatures of the FETs and the heat sink are dominant. The temperature rise substantially corresponds to that of the heat sink.

Therefore, over the entire current region, the ambient temperature (second term of Expression (5) described above) is dominant. Therefore, the overheat-protection characteristic (coefficient) becomes similar to the characteristic 21 shown in FIG. 4 referred to above. As the heat-source current, the supply current in the same phase, that is, the current flowing through the FETs can be used.

[Choke Coil]

Next, the choke coil 13 depends on the flowing current and has a characteristic similar to the characteristic 21 shown in FIG. 4 referred to above. Precisely, the current in this case depends on the battery current. The reason is as follows. The motor current is subjected to feedback control so as to have a target value. The current of the choke coil 13 decreases when the battery voltage is high. On the contrary, when the battery voltage is low, the current of the choke coil 13 increases.

As an estimate current, the current depending not on the battery voltage but on a total current flowing through the components provided downstream can be used. By using a control current value calculated by the CPU 11, the estimate current may depend on the phase current. Specifically, the characteristic which is similar to the characteristic 21 but has a current on the X-axis different from that of the characteristic 21 and has constants (A2, B2, and C2) and gradual-decrease curve different from those of the characteristic 21 may be used.

The permanent magnets used in the motor, which are provided outside of the control unit 10, do not cause self-heating, and therefore the characteristic is determined by the ambient temperature. The current in this case depends on the total current, as in the case of the choke coil 13. Therefore, the characteristic (coefficient) of the permanent magnets becomes equivalent to the characteristic 21 shown in FIG. 4 referred to above. However, the values (A2, B2, and C2) and the gradual-decrease curve may be different from those of the choke coil 13.

The permanent magnets are provided in the vicinity of the motor coils $3u$, $3v$, and $3w$ which generate a large amount of heat. There is a possibility that the characteristic depends on each phase current in some cases. When the temperature is uniformly distributed over the entire motor, there is a possibility that the characteristic depends on the total current. Therefore, two characteristics can be provided respectively to each phase current and the total current.

As described above, according to the first embodiment, the two characteristics, that is, the self-heating characteristic and the ambient-temperature characteristic, are provided. The overheat-protection coefficient with respect to the heat-source current is calculated for each of the components. Finally, the current upper-limit value obtained from each of the components is sequentially corrected based on the result of calculation. The smallest one is selected from the corrected current upper-limit values to continue the motor control with the current limitation.

Therefore, the upper-limit value of the current supplied to the motor becomes the smallest value. However, the smallest upper-limit value corresponds to the current upper-limit value determined in consideration of the self-heating characteristic and the ambient-temperature characteristic for each of the components. Therefore, the control is performed so as to prevent an excessive countermeasure for overheat protection as much as possible as compared with the cases of the conventional devices. As a result, the electric power steering control device which can achieve the continuity of the control and effectively assist the steering force can be realized.

Second Embodiment

The first embodiment has described the case where the overheat-protection characteristic (coefficient) of the component having a large amount of self-heating is calculated in consideration of both the characteristic depending on the self-heating and the characteristic depending on the ambient temperature. On the other hand, a second embodiment of the present invention describes the case where the two characteristics are treated as a single characteristic.

Referring to FIG. 4 referred to above, the following is understood. In the low-current regions (A1 to C1 and A2 to C2), the two characteristics do not have a large difference. In the high-current regions (C1 or larger and C2 or larger), the two characteristics apparently have a difference.

Figure 5:
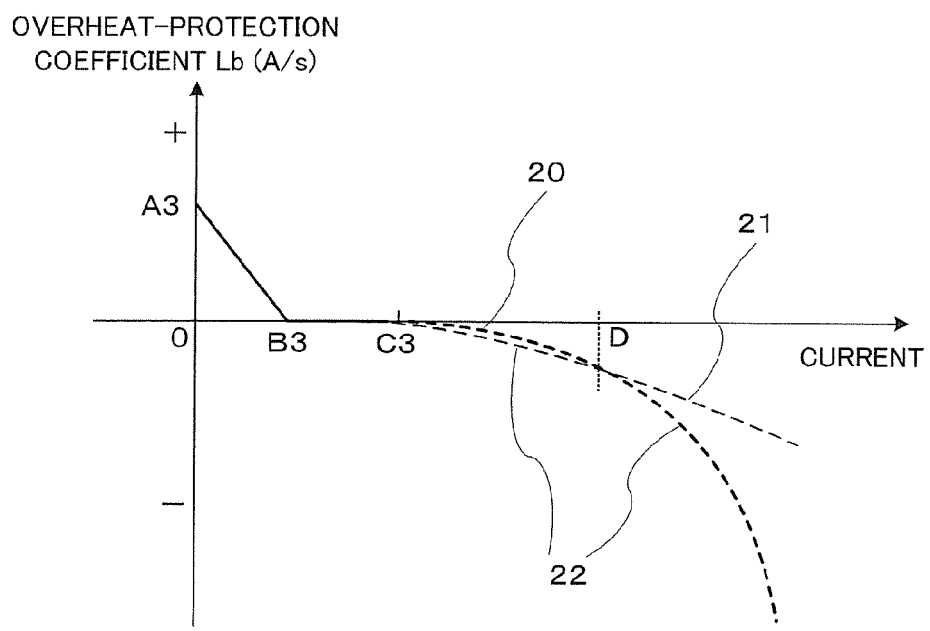
FIG. 5 is an overheat-protection characteristic diagram according to a second embodiment of the present invention.

FIG. 5 is a graph showing an overheat-protection characteristic according to the second embodiment of the present invention. As shown in FIG. 5, when the current is smaller than the high-current region, set values (A3, B3, and C3) are used. When the current is in the high-current region (C3 or larger), a single characteristic obtained by the combination of the two characteristics of the two gradual-decrease curves is used.

Specifically, for example, for the current up to a value D in the middle of the high-current region, the gradual-decrease curve 21 depending on the ambient-temperature characteristic is used. When the current is equal to or larger than the value D, the curve 20 depending on the self-heating characteristic is used. Specifically, a gradual-decrease curve 22 obtained by integration as described above corresponds to a single characteristic obtained by the combination of the two characteristics, that is, the ambient-temperature characteristic and the self-heating characteristic.

As described above, according to the second embodiment, the self-heating characteristic and the ambient-temperature characteristic are integrated into a single characteristic so as to provide a single overheat-protection characteristic for each component. As a result, not only the effects as those of the first embodiment described above are obtained, but also a memory capacity and processing time of the CPU can be reduced.

The second embodiment has described the case where the characteristics are switched and integrated at one point (D) while the characteristics are gradually decreasing in the high-current region. However, the number of points at which the characteristic is switched is not limited to one and may be plural.

Specifically, it is desirable to appropriately set the number of points at which the characteristic is switched in consideration of the heat generation and heat radiation performance of each of the components to obtain the characteristic most suitable for the actual situation. The characteristic can be expressed in the form of a mathematical expression. When a plurality of characteristics are varied, the characteristics may be stored in the form of a map in the CPU.

Third Embodiment

A third embodiment of the present invention describes the case where a single component has a plurality of characteristics in accordance with an atmospheric temperature. In the control unit 10 illustrated in FIG. 1 referred to above, the temperature sensor 16 is mounted in the vicinity of the heat-generating components (switching elements T1 to T6, for example) of the driving section 12 or the heat sink for radiating the heat of the heat-generating components.

The temperature sensor 16 may be a thermosensitive element such as a thermistor. The CPU 11 reads temperature information detected by the temperature sensor 16 to obtain a temperature in the vicinity of the location where the temperature sensor 16 is mounted.

Figure 6:
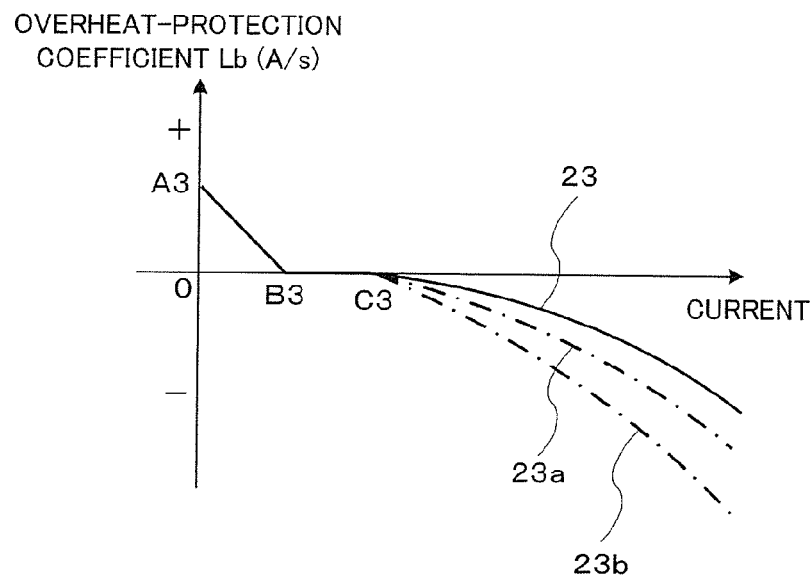
FIG. 6 is an overheat-protection characteristic diagram according to a third embodiment of the present invention.

FIG. 6 is an overheat-protection characteristic diagram according to the third embodiment of the present invention. In the characteristic diagram of FIG. 6, a characteristic 23 indicated by a solid line corresponds to a basic characteristic 23 of the corresponding component. In the third embodiment, a plurality of characteristics (characteristics 23b and 23c) approximately similar to the basic characteristic 23 are provided. Therefore, the third embodiment has a technical feature of changing the characteristic 23 to the characteristics 23a and 23b in use in accordance with the temperature information (in accordance with the temperature rise, in particular).

For example, the characteristic 23 is preset as a characteristic in the case where a temperature in the vicinity of the location where the temperature sensor 16 is mounted is 30° C. Similarly, the characteristic 23a is preset as a characteristic in the case where the temperature described above is 40° C., whereas the characteristic 23b is preset as a characteristic in the case where the temperature described above is 50° C. The CPU 11 selects and uses an appropriate one of the characteristics in accordance with a current temperature based on the result of measurement by the temperature sensor 16.

Specifically, as the atmospheric temperature rises, the range of increase of the allowable temperature of the component becomes smaller. By applying this tendency, the characteristic is changed so that a rate of decrease in accordance with the gradual-decrease curve becomes larger for the characteristic for the higher temperature to obtain the severer overheat-protection characteristic as shown in FIG. 6.

As described above, according to the third embodiment, the plurality of overheat-protection characteristics are provided for each of the components in accordance with the atmospheric temperature so that the appropriate characteristic is selected for each component depending on the atmospheric temperature. Therefore, not only the effects similar to those of the first and second embodiments described above are obtained, but also a more appropriate countermeasure for overheat protection in accordance with the actual situation of the control device can be taken.

As the overheat-protection characteristic according to the third embodiment, the plurality of characteristics are provided in accordance with the temperature condition. The change in temperature is not abrupt, and therefore the characteristic is not required to be changed and switched frequently. Therefore, it is recommended to insert a filter or a hysteresis to suppress the occurrence of change or switching of the characteristic so as to prevent the characteristic from being frequently changed.

Fourth Embodiment

Figure 7:
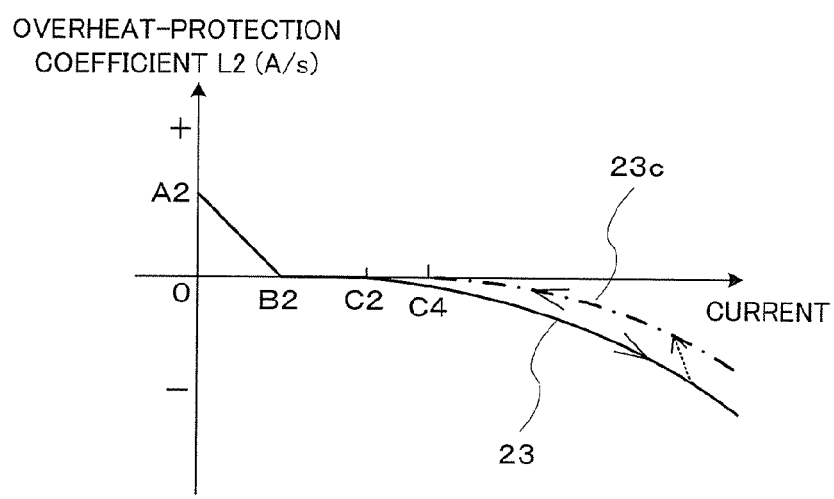
FIG. 7 is an overheat-protection characteristic diagram according to a fourth embodiment of the present invention.

A fourth embodiment of the present invention describes the case where an overheat-protection characteristic for an increasing current value of the heat source and an overheat-protection characteristic for a decreasing current value of the heat source are separately provided. FIG. 7 is an overheat-protection characteristic diagram according to the fourth embodiment of the present invention. FIG. 7 exemplarily shows, by taking the overheat-protection characteristic for the ambient temperature as an example, the case where the characteristic 23 which becomes a gradual-decrease curve after C2 is used when the current value of the heat source is increasing and a characteristic 23c which becomes a gradual-decrease curve after C4 is used when the current value of the heat source is decreasing.

As described above, when the current of the heat source tends to increase, the overheat-protection coefficient based on the severer gradual-decrease characteristic can be set to carry out quick overheat protection by using the characteristic 23. On the other hand, when the current of the heat source tends to decrease, the overheat-protection coefficient based on the looser gradual-decrease characteristic can be set by using the characteristic 23c. As a result, after the current starts having a tendency to decrease, the limitation is eased to suppress a reduction in assist for the steering force to prevent excessive overheat protection. As a result, appropriate overheat protection can be carried out.

As described above, according to the fourth embodiment, the separate overheat-protection characteristics are respectively provided for the case where the current value of the heat source tends to increase and the case where the current value of the heat source tends to decrease, for each of the components. An appropriate characteristic is selected for each of the components, depending on the increasing/decreasing tendency of the current value. Therefore, not only the same effects as those of the first to third embodiments described above are obtained, but also a more appropriate countermeasure for overheat protection in accordance with the actual condition of the control device can be carried out.

Although the three-phase brushless type motor is used as the motor in the first to fourth embodiments described above, the present invention is not limited thereto. The present invention is also applicable to a motor with a brush and a motor having four or more phases. Further, as the components present in the path in which the motor current flows, even components other than those described above can be used by defining an overheat-protection characteristic under the same idea as that described above.

What is claimed is:

1. An electric power steering control device for assisting a steering force of a steering wheel of a vehicle, the electric power steering control device comprising a control unit for supplying a current for driving an electric motor,
    wherein the control unit prestores a first overheat-protection characteristic corresponding to self-heating and a second overheat-protection characteristic corresponding to an ambient temperature in a storage section for each component mounted in the control unit as an overheat-protection characteristic specifying a correspondence relationship between a heat-source current value of the each component and an overheat-protection coefficient defining an increase/decrease amount of a current upper-limit value, and sequentially corrects the current upper-limit value obtained for the each component by using overheat-protection coefficients of both the first overheat-protection characteristic and the second overheat-protection characteristic to continue current control for the electric motor with a limitation on the current for driving the electric motor in accordance with a smallest current upper-limit value of results of the correction.

2. An electric power steering control device according to claim 1, wherein the control unit prestores, in the storage section, a third overheat-protection characteristic obtained by integrating the first overheat-protection characteristic and the second overheat-protection characteristic instead of prestoring the first overheat-protection characteristic and the second overheat-protection characteristic in the storage section, and sequentially corrects the current upper-limit value obtained for the each component by using an overheat-protection coefficient of the third overheat-protection characteristic to continue the current control in accordance with a smallest current upper-limit value of results of the correction.

3. An electric power steering control device according to claim 2, wherein:
    the third overheat-protection characteristic stored in the storage section has a current region including a low-current region and a high-current region;
    the overheat-protection coefficient changes from zero to a negative value in a gradually decreasing direction as the current value increases in the high-current region and changes from a positive value to zero in the gradually decreasing direction as the current value increases in the low-current region;
    the high-current region is includes a first high-current region and a second high-current region having a larger current value than a current value of the first high-current region; and
    the first overheat-protection characteristic and the second overheat-protection characteristic are integrated into the third overheat-protection characteristic for a component having a larger amount of self-heating by using the second overheat-protection characteristic corresponding to a peripheral component in the first high-current region and using the first overheat-protection characteristic corresponding to self-heating in the second high-current region.

4. An electric power steering control device according to claim 1, wherein the control unit adds an overheat-protection coefficient calculated from the first overheat-protection characteristic and an overheat-protection coefficient calculated from the second overheat-protection characteristic to calculate a final overheat-protection coefficient for the each component, and sequentially corrects the current upper-limit value obtained for the each component by using the calculated final overheat-protection coefficient to continue the current control for the electric motor with a limitation on the current for driving the electric motor in accordance with a smallest current upper-limit value of results of the correction.

5. An electric power steering control device according to claim 1, wherein:
    the overheat-protection characteristic stored in the storage section has a current region including a low-current region and a high-current region; and
    the overheat-protection coefficient changes from zero to a negative value in a gradually decreasing direction as the current value increases in the high-current region and changes from a positive value to zero in the gradually decreasing direction as the current value increases in the low-current region.

6. An electric power steering control device according to claim 1, wherein the control unit prestores a plurality of different overheat-protection characteristics in the storage section in accordance with a temperature condition of a heat-generating component provided in the control unit, selects one overheat-protection characteristic from the plurality of different overheat-protection characteristics in accordance with temperature information based on a result of detection by a temperature sensor mounted in a vicinity of the heat-generating component, and sequentially corrects a current upper-limit value obtained for the each component by using the selected one overheat-protection characteristic to continue the current control for the electric motor with a limitation on the current for driving the electric motor in accordance with a smallest current upper-limit value of results of the correction.

7. An electric power steering control device according to claim 1, wherein:
- each overheat-protection characteristic stored in the storage section includes an overheat-protection characteristic for current increase, which is used to obtain the overheat-protection coefficient when the current value tends to increase, and an overheat-protection characteristic for current decrease, which is used to obtain the overheat-protection coefficient when the current value tends to decrease; and
- the control unit uses the overheat-protection characteristic for current increase to obtain the overheat-protection coefficient when the current value tends to increase, and uses the overheat-protection characteristic for current decrease to obtain the overheat-protection coefficient when the current value tends to decrease.

8. An electric power steering control method used for an electric power steering control device for assisting a steering force of a steering wheel of a vehicle,
- the electric power steering control device comprising a control unit for supplying a current for driving an electric motor, the electric power steering control method being configured to perform current control for the electric motor in accordance with a current upper-limit value based on a thermal characteristic of each component mounted in the control unit, and comprising:
- prestoring a first overheat-protection characteristic corresponding to self-heating and a second overheat-protection characteristic corresponding to an ambient temperature in a storage section for the each component as an overheat-protection characteristic specifying a correspondence relationship between a heat-source current value of the each component and an overheat-protection coefficient defining an increase/decrease amount of the current upper-limit value; and
- sequentially correcting, in the control unit, the current upper-limit value obtained for the each component by using overheat-protection coefficients of both the first overheat-protection characteristic and the second overheat-protection characteristic to continue the current control in accordance with a smallest current upper-limit value of results of the correction.

* * * * *